Patented Apr. 28, 1942

2,280,777

UNITED STATES PATENT OFFICE 2,280,777

SYNTHETIC NAPHTHOQUINONE DERIVATIVES

Herman James Almquist, El Cerrito, and Alvin A. Klose, Berkeley, Calif., assignors to Merck & Co., Inc., Rahway, N. J., a corporation of New Jersey No Drawing. Application February 7, 1940, Serial No. 317,776

2 Claims. (Cl. 260—396)

This invention relates to a synthetic vitamin K active preparation and to processes of producing the same.

Various studies of vitamin K materials had indicated a quinoid structure for vitamin K, and this indication was confirmed by the discovery of the applicants that 2-methyl-3-hydroxy-1,4-naphthoquinone has vitamin K activity.

The work of the applicants in this line of research ultimately convinced them that the substance which has more recently been defined as vitamin $K_1$ is 2-methyl-3-phytyl-1,4-naphthoquinone.

This product is prepared by the condensation of phytyl bromide with 2-methyl-1,4-naphthoquinone, in the manner described in the following example:

To 1 gram of 2-methyl-1,4-naphthoquinone are added 2 cc. of glacial acetic acid, 10 cc. of petroleum ether, 1 gram of zinc dust, and 0.6 cc. of phytyl bromide. The mixture is refluxed in the dark for about 20 hours. About 20 cc. of absolute ethanol is added, and the mixture is then extracted with hexane. The resultant extract is washed repeatedly with water, filtered, and fractionated in a molecular still of the type, but much larger than that, which was described by one of us in the Journal of Biological Chemistry, 120, 635 (1937). A temperature of at least 140° C. is maintained at the closed end of this still during the distillation. Unchanged 2-methyl-1,4-naphthoquinone and phytyl bromide are removed in the first distillate fraction. The second or vitamin fraction is redistilled. It is next placed in methanol and is crystallized out repeatedly by cooling with solid carbon dioxide and centrifuging, as also described in the foregoing Journal of Biological Chemistry reference, and the filtrate is discarded each time.

The product so obtained is practically pure 2-methyl-3-phytyl-1,4-naphthoquinone. It has the color, the oily form and the solubilities characteristic of vitamin K from alfalfa, and it distills in the molecular still under the same temperature and pressure.

Anal. Calcd. for $C_{31}H_{46}O_2$: C—82.6, H—10.3.

Found: C—82.1, 82.5; H—10.7, 10.6.

The potency of this product is approximately 56,000 cc. of the applicants' reference standard per gram by chick assay (Biochem. J., 33, 1055 (1939)). A natural preparation of vitamin $K_1$ assayed concurrently gave a value of 61,500. This value agrees closely with others published by these applicants (J. Biol. Chem., 130, 787 (1939)). An assay of a sample of synthetic vitamin $K_1$ prepared by a different process has yielded a value of 57,000. The intensity of the color reaction (J. Am. Chem. Soc., 61, 1610 (1939)) of the product of the described process is the same as that of the vitamin from natural sources.

Pharmacological tests made with the product of the applicants' process show that, when it is administered orally to vitamin K deficient chicks two weeks old at a level of 0.002 mg. per chick, its antihemorrhagic activity is comparable to that of natural vitamin $K_1$ in restoring the blood clotting power to normal within a few hours.

The foregoing example is given by way of illustration and not of limitation, as it is obvious that certain modifications may be made in the steps of this process, and in the kinds and proportions of the materials employed, without departing from the spirit and scope of the invention and the purview of the claims.

We claim:

1. The process for the synthetic production of 2-methyl-3-phytyl-1,4-naphthoquinone which comprises the steps of condensing phytyl bromide with 2-methyl-1,4-naphthoquinone by refluxing them in the presence of petroleum ether, glacial acetic acid and zinc dust, and in the dark for substantially twenty hours, adding absolute ethanol to the reaction mixture, extracting the reaction product with hexane, fractionating the washed and filtered reaction product in a molecular still in which the closed end is maintained at a temperature of at least 140° C., redistilling the vitamin fraction, dissolving the distillate in methanol, and crystallizing the vitamin product by cooling with solid carbon dioxide and centrifuging.

2. In a process for the synthetic production of 2-methyl-3-phytyl-1,4-naphthoquinone the step of refluxing 2-methyl-1,4-naphthoquinone with phytyl bromide in the presence of glacial acetic acid and metallic zinc.

HERMAN JAMES ALMQUIST.
ALVIN A. KLOSE.